June 23, 1970     C. T. NORDBERG ET AL     3,516,312
ROTATABLE CUTTING APPARATUS
Filed March 7, 1968     3 Sheets-Sheet 1
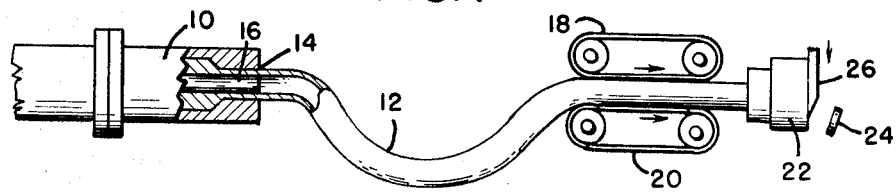
FIG. 1
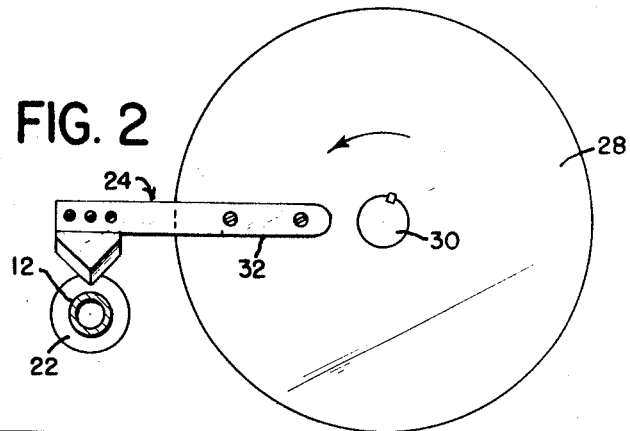
FIG. 2
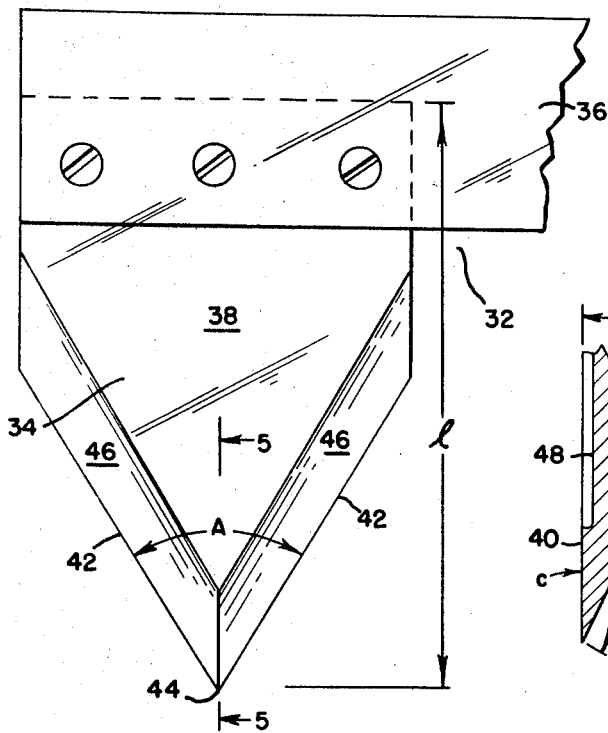
FIG. 3
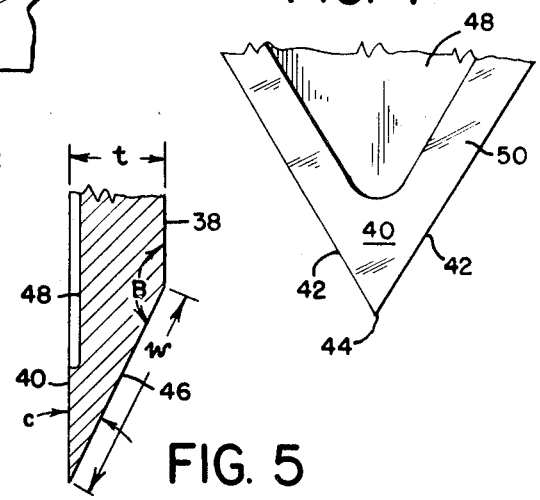
FIG. 4
FIG. 5
INVENTORS
CALVIN T. NORDBERG
JOHN A. MERBOTH
ROBERT D. SIVERSON
BY
ATTORNEY June 23, 1970  C. T. NORDBERG ET AL  3,516,312
ROTATABLE CUTTING APPARATUS
Filed March 7, 1968  3 Sheets-Sheet 3
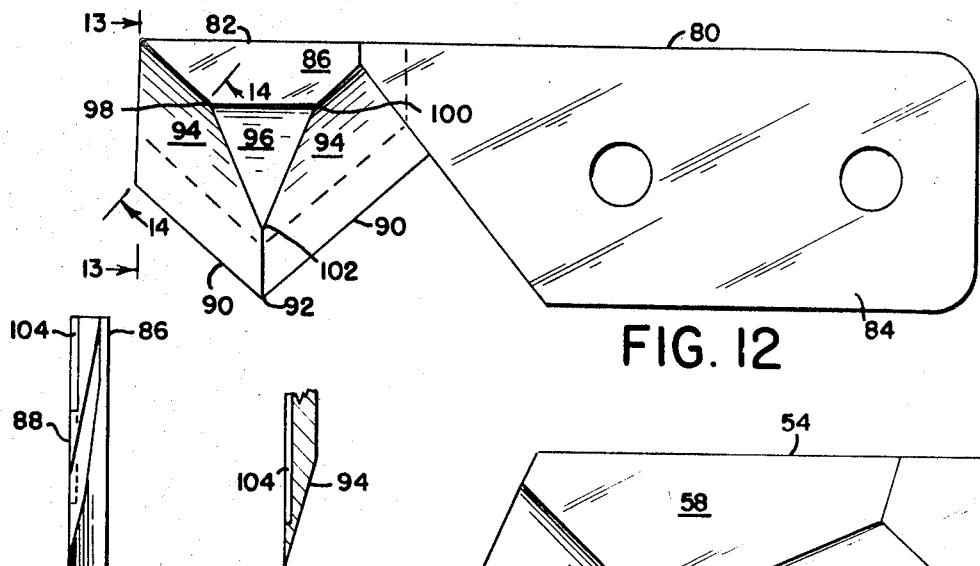
FIG. 12
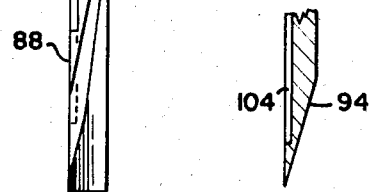
FIG. 13  FIG. 14
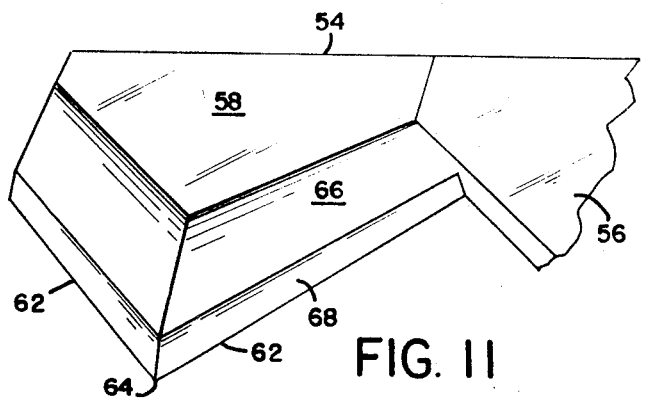
FIG. 11
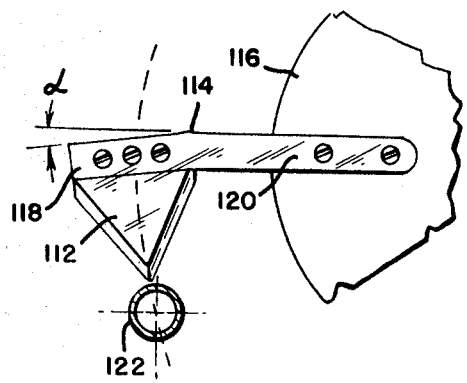
FIG. 15
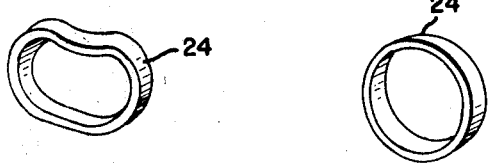
FIG. 17  FIG. 16
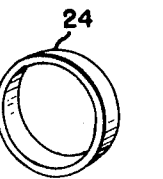
INVENTORS
CALVIN T. NORDBERG
JOHN A. MERBOTH
ROBERT D. SIVERSON
BY *L. Mooy Lillehougen*
ATTORNEY

United States Patent Office 3,516,312
Patented June 23, 1970

3,516,312
ROTATABLE CUTTING APPARATUS
Calvin T. Nordberg, South Haven, John A. Merboth, Hopkins, and Robert D. Siverson, Minneapolis, Minn., assignors to General Mills, Inc., a corporation of Delaware
Filed Mar. 7, 1968, Ser. No. 711,358
Int. Cl. B26d 3/16
U.S. Cl. 83—42
11 Claims

ABSTRACT OF THE DISCLOSURE

An apparatus for cutting a rope of material into slices or segments of predetermined thickness or length without deforming the rope or the slice during the cutting operation. A pointed cutting blade, having a pair of beveled cutting edges which meet to form the point, intersects with the rope in such a manner that the point pierces the surface of the rope and the two cutting edges provide a double slicing action.

---

The present invention relates to a cutting apparatus, and more particularly to an improved cutting device for slicing a rope-like product formed of a readily deformable material, without crushing or otherwise deforming the product.

According to the known prior art, numerous types of devices are known for cutting or slicing strands or ropes of material into segments or slices of predetermined length. In food applications for example, a rope of dough material is sometimes formed by discharging the material through a die opening or orifice in an extrusion apparatus. In some cases the rope of material is immediately cut into segments of predetermined length by a knife which passes by the die opening; while in other instances, the extruded product is permitted to dry or temper for a short period of time before it is sliced. Both solid and tubular (such as macaroni) extrudates have been formed and sliced in this manner. According to one known practice, the cutting or slicing operation is accomplished by means of a straight-edged knife blade which is caused to move along a straight line past the orifice or other cutting station, and sometimes the knife blade is mounted for rotation about an axis in such a manner that it defines an arc as it travels past the cutting station. The effect of this cutting action is that the material is chopped by the knife blade as the knife and the material come in contact with each other.

Such a cutting operation has been found to be satisfactory in many instances. It has however, been found that such a cutting action has certain disadvantages. In many instances, it is desirable that the rope which is being sliced maintain a predetermined cross-sectional shape, with a minimum amount of deformation occurring during the cutting operation. Moreover, the rope is often formed of a material which has a relatively soft and/or easily deformable texture; consequently, it might be difficult to maintain the desired cross-sectional shape during the slicing operation, because when the soft rope is subjected to the chopping action of the knife blade, the force of impact, as well as the force due to the friction between the blade and the product, is such that it tends to compress and deform the material to some extent as it is being cut. The result of this operation is that the sliced product may be deformed to an objectionable extent. This is particularly true when the rope is a tubular or partially hollow strand, and/or when the segments or slices are quite short in length or thickness. As known, such strands tend to collapse quite easily, especially if the material is soft.

Accordingly, one object of the present invention is to provide an improved cutting apparatus.

Another object is to provide a cutting device for slicing a product formed of a readily deformable material without deforming the product during the slicing operation.

A further object is to provide a cutting apparatus having an improved cutting blade for slicing tubular or partially hollow products formed of a relatively soft, easily deformable material, without crushing or compressing the walls of said product, by piercing the surface and cutting the material from the inside out.

A still further object is to provide an improved pointed cutting blade having a pair of cutting edges which provide a double cutting action during the slicing process.

Another object is to provide a process for slicing a rope-like product formed of a readily deformable material, without deforming the product during the slicing operation.

Other objects and advantages will become apparent from a consideration of the following specification and accompanying drawings. Before proceeding with a detailed description of the invention however, a brief description of it will be presented.

In general, the cutting apparatus includes a pointed cutting blade mounted for movement along a prescribed path. The blade is provided with a pair of beveled cutting edges which are joined together to form the point. A rope-like product formed of a relatively soft, readily deformable material is caused to move along a given path past a cutting station by appropriate means, and the cutting blade is caused to move along a path normal to the direction of movement of the product so as to intersect with the product and slice a segment therefrom. The product and the cutting blade are oriented in such a manner that the point of the cutting blade pierces the surface of the rope first and the two cutting edges tend to cut the rope from the inside out, without crushing or otherwise deforming the product.

The invention will best be understood by reference to the following drawings wherein:

FIG. 1 is a partial schematic view illustrating a tubular extrudate being formed by an extruder and subsequently being cut into segments of predetermined length by a cutting apparatus;

FIG. 2 is a partial end view of the cutting apparatus just prior to cutting a segment from the extrudate;

FIG. 3 is an enlarged partial front view of the cutting blade illustrated in FIG. 2;

FIG. 4 is a rear view of the cutting blade depicted in FIG. 3;

FIG. 5 is an enlarged partial sectional view taken along line 5—5 of FIG. 3;

FIG. 11 is a partial perspective view showing the cutting blade of FIG. 7;

FIG. 12 illustrates another embodiment of the invention;

FIG. 13 is an end view taken along line 13—13 of FIG. 12;

FIG. 14 is a partial sectional view taken along line 14—14 of FIG. 12;

FIG. 15 illustrates another embodiment of the invention;

FIG. 16 is a perspective view illustrating a segment of the extrudate after the extrudate has been sliced; and FIG. 17 illustrates a typical tubular slice formed by using known prior art cutting devices.

Figure 6A:
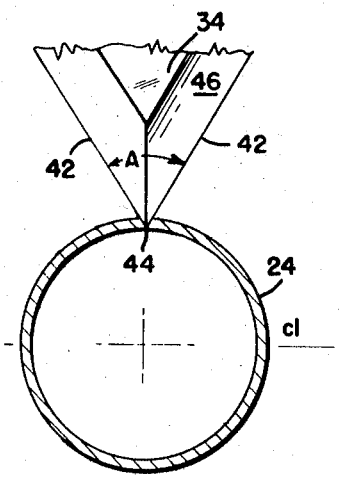
FIGS. 6A–6C are enlarged partial sectional views illustrating the cutting blade piercing and shearing a tubular product.

FIG. 1 illustrates an extrusion apparatus designated generally by reference numeral 10, for forming a tubular, thin-walled extruded product or extrudate 12. Such an extrusion device includes an orifice or die opening 14 into which a die insert or mandrel 16 projects, thereby forming an annular orifice through which the tubular extrudate is forced. Since such extrusion devices are generally well known in the art, they will not be described in further detail. A pair of counter-rotating belt assemblies 18 and 20 are provided for gripping the material at a point remote from the extruder 10 and advancing it toward a cutting station and positioning it in an end piece or guide 22, at which point the extrudate is cut into slices or pellets 24 of predetermined length or thickness, by a cutting apparatus designated generally by numeral 26. It should be realized of course that if desired, the cutting apparatus 26 could be positioned adjacent to the extrusion orifice so that the extrudate is sliced immediately upon extrusion. By remotely positioning the apparatus 26 in the manner disclosed, the extrudate 12 is permitted to temper or dry slightly before it is sliced. It should be realized of course that the product 12 might have other forms as well. For example, a solid rope might be effectively formed and sliced; and a product which is partially hollow or tubular, might also be formed and sliced. It should also be realized that the cross-sectional shape might be other than circular as well.

As shown in FIG. 2, the cutting apparatus 26 includes a head 28 mounted for rotation about the axis of shaft 30, by appropriate means (not shown). One or more cutting devices 32 are secured to the head 28 by appropriate means so that one end extends radially away from the shaft axis. If preferred, appropriate means might be provided for guiding and positioning a plurality of extrudates around the member 28 in such a manner that the cutting device 32 cuts a number of pellets as it traverses around the axis of shaft 30. It should be realized that the cutting device 32 might be caused to move along a straight line if preferred, rather than about the axis of shaft 30.

FIGS. 3–5 illustrate the cutting device 32 in greater detail. As shown in FIG. 3, the cutting device 32 includes a pointed cutting blade 34 connected to the head 28 by an arm or shank 36. As shown, the blade 34 is attached to one end of the arm by rivets or other fastening means, and the arm is attached at its other end to the head 28 by appropriate means, such as bolts.

The cutting blade 36 has a front or top surface 38, a back or bottom surface 40, and a pair of cutting edges 42–42 which are joined together to form the point or corner 44, having a size defined by angle A. Each cutting edge is formed by a beveled cutting surface 46 which lies in a plane intersecting with the front surface 38 to form a first angle B, and with the back surface to form a second angle C which is smaller than the angle B, (note FIG. 5). The width w of the cutting surfaces 46 is substantially greater than the thickness t of the blade. The length 1 generally denotes the distance from the point 44 to the back edge of the blade.

The size of the various angles can vary within fairly large ranges. It might be pointed out that if the angle A is too large, the point 44 becomes too blunt, and the desired cutting action might not be obtained. It has been found that the angle A might satisfactorily range from about 60–140°, although for certain applications it might be preferred that the angle be within a narrower range. As illustrated in FIG. 3 for example, the angle A is an acute angle. The angle C might vary in size from about 15–30°. If the angle C is too large, the cutting edges 42 are too blunt or dull; on the other hand, if the angle C is too small, the cutting edges wear too fast and become dull too quickly during the cutting operation. Furthermore, if the angle C is too small, the blade is not rigid enough and the blade might deflect slightly during the cutting operation, thus causing poor pellet thickness uniformity. The size of angle B of course, depends on the size of angle C.

The back surface 40 is provided with a recess or cavity 48 which is separated from each of the cutting edges by a land portion 50. As shown in FIG. 4, the recess covers the major portion of the back surface of the cutting blade. The depth of the recess is quite small, e.g. 5–10% of the thickness of the cutting blade. It has been discovered that provision of such a recess improves the overall efficiency of the cutting apparatus. In many instances, the material being extruded and cut is formed of a soft, somewhat sticky material; as a result, the back surface 40 of the cutting blade 34 ofttimes becomes smeared or covered with the material and this adversely affects the cutting operation. The recess 48 eliminates, or at least minimizes, the extent of product build-up on the back surface of the blade.

In operation, it has been found that this invention is particularly useful for cutting a tubular, rope-like product formed from a number of food ingredients. As known, materials which form such products are mixed and cooked to form a gelatinized dough which is then extruded through a die opening, such as die opening 14, to form a product 12 having the desired shape and size. The formation of such doughs is well known in the art; therefore, no further discussion of their formation will be presented. Usually, the extruded product is quite soft, pliable, and easily deformable when it is extruded through the die opening 14. The belt assemblies 18 and 20 grip the product 12 and guide it into the end piece 22 at the cutting station, thus permitting the product 12 to dry or temper slightly before it is sliced. By rotating the head 28, the cutting blade 34 intersects with the product 12 and cuts off a segment from the extrudate.

Figure 6B:
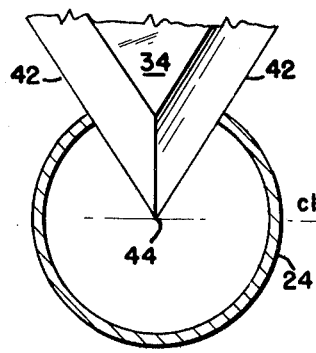
Figure 6C:
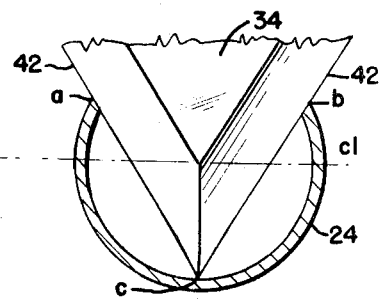

As illustrated in FIG. 1, the blade 34 moves along a path normal to the direction of movement of the rope at the cutting station. Moreover, as depicted in FIGS. 2 and 6, the rope is positioned relative to the cutting blade 34 so that the point 44 pierces and penetrates the surface of the extrudate first, and the cutting edges 42—42 shear the product along two sides, as the blade moves relative to the extrudate, thus providing a double cutting action. Furthermore, the blade 34 tends to cut the hollow tube from the inside out, and as it does, it tends to slightly deflect or push the wall of the tube outwardly rather than straight downwardly, thus minimizing the extent of crushing or collapsing of the tube. It has been found that for optimum cutting of a cylindrical tube, the angle A of the blade should preferably be an acute angle. FIGS. 6A–6C illustrate various positions of the cutting blade 34 relative to the tube 12 during the cutting operation. In FIG. 6A, the point 44 is beginning to pierce the surface of the tube; in FIG. 6B, the point has reached the center of the tube, note that the edges 42 tend to cut the tube from the inside out and as a result, the blade tends to force the wall of the tube outwardly; and in FIG. 6C, the point 44 is beginning to pierce the bottom of the tube. As depicted in FIG. 6C, the edges 42 contact the tube wall at contact points a and b above the center-line of the tube, and the point 44 contacts the tube at contact point c, thus providing a three point contact at the time the lower wall is pierced. If the angle A was an obtuse angle, all the contact points would be below the center-line.

The speed of rotation of the head 28 about the axis of shaft 30 is not overly critical, and it might vary from about 100 to 2000 r.p.m., for example. It should of course, be synchronized with the lineal speed of the product 12, so that the slices 24 have the desired thickness or length. The result of the cutting action is that the thin-walled extrudate is sliced with a minimum of impact, thus minimizing any deforming or crushing of the thin-walled tube. FIG. 16 illustrates a typical ring-shaped slice 24 which has been cut from the extrudate 12 by using the present invention. In comparison, FIG. 17 shows a typical product formed by using cutting devices similar to those known in the prior art, e.g. a knife blade having a single straight edge.

FIGS. 7–11 illustrate another embodiment of the invention. In this embodiment, the cutting device 52 includes a pointed cutting blade 54 integrally connected to an arm or shank 56, the latter being attachable to the head 28 by appropriate means, such as bolts. Forming the blade 54 and the arm 56 as one piece has certain advantages. It has been found for example, that when the head 28 is rotated at a high rate of speed, e.g. over 1000 r.p.m., a small amount of flutter or vibration of the blade with respect to the arm, sometimes occurs; this affects the overall optimum operation of the apparatus, especially when the slices are relatively thin. This problem can be eliminated by using an embodiment similar to that shown in FIG. 7.

Figure 9:
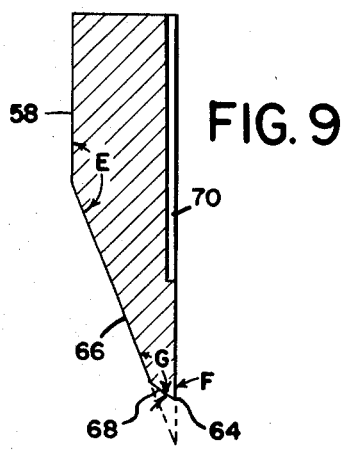
FIG. 9 is an enlarged sectional view taken along line 9—9 of FIG. 7.

The cutting blade 54 has a front surface 58, a back surface 60, and a pair of cutting edges 62—62 which are joined together to form the point 64, having a size defined by angle D. Each cutting edge is formed by a pair of beveled cutting surfaces, a first beveled cutting surface 66 which lies in a plane intersecting with the front surface 58 to form a first angle E, and a second beveled cutting surface 68 interposed between the first cutting surface 66 and the edge 62 of the blade 54 (note FIG. 9). The second beveled cutting surface 68 lies in a plane which intersects with the back surface 60 to form a second angle F, and with the first cutting surface 66 to form a third angle G at their juncture. As depicted in FIG. 9, the second cutting surface 68 is substantially narrower than the first cutting surface 66.

Figures 7, 8:
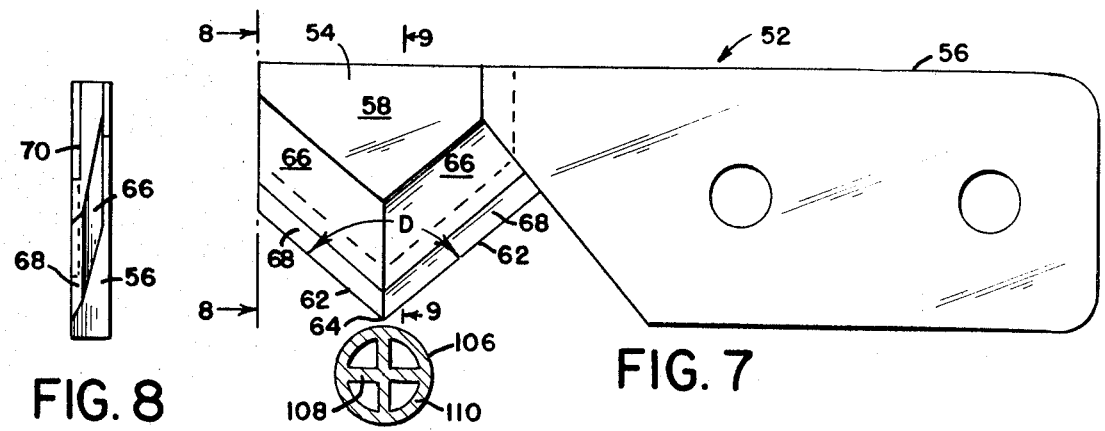
FIG. 7 illustrates another embodiment of the cutting device.
FIG. 8 is an end view taken along line 8—8 of the cutting device shown in FIG. 7.

The size of the various angles can vary somewhat. As illustrated in FIG. 7, the angle D is an obtuse angle. It has been found that a shorter blade, i.e. the length as measured from the point 64 to the back edge, and one having a large angle D works better under certain cutting conditions, than one similar to the blade depicted in FIG. 3. For example, when cutting a partially tubular or hollow product, such as product 106 having a number of webs or spokes 108 and a rim 110, a more uniform cut is obtainable, especially when the thickness of the slice or pellet is quite small, e.g. 0.040 of an inch. When the thickness of the pellet is quite small, blades having a relatively greater length from the point 64 to the back edge sometimes tend to deflect slightly in a direction normal to the length of the blade, during the cutting operation. As a result, the thickness of the pellet is not always uniform.

The angle E might vary from about 150–165°, and the angle F might vary from about 25–40°. The size of angle G of course, depends upon the size of the first two angles. By providing the second beveled cutting surface 68 in the manner described, the angle F is somewhat larger than the angle which would be formed if only a single beveled surface was provided, note the dotted lines in FIG. 9. This feature prevents the cutting edges 62 of the blade 54 from wearing and becoming dull as rapidly. It has been found for example, that for cutting certain materials, such cutting blades wear 4–5 times longer than those having a single cutting surface.

Figure 10:
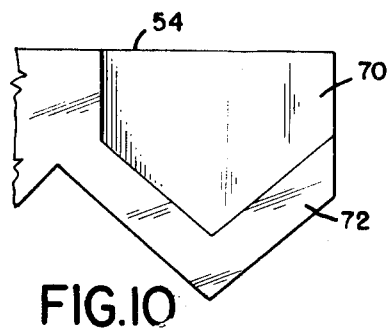
FIG. 10 is a partial rear view of the cutting device depicted in FIG. 7.

The back surface is provided with a recess or cavity 70 which is separated from each of the cutting edges by a land portion 72, note FIG. 10. The purpose of the recess 70 is the same as the recess 48 described above in conjunction with the first embodiment. The recess 70 is quite shallow and need not be more than about 5–10% of the thickness of the cutting blade 54.

In operation, the cutting device 52 is attached to the head 28 of the cutting apparatus so that the point 64 pierces and penetrates the surface of an extrudate, and the cutting edges 62—62 provide a double cutting action, in the same manner described hereinbefore in connection with the first embodiment. The cutting action is accomplished with a minimum amount of deformation or crushing of the tubular product, and it permits the extrudate to be sliced into segments having relatively small lengths.

FIGS. 12–14 illustrate a further embodiment of the cutting device which is quite similar to the embodiments illustrated and described hereinbefore. The cutting device 80 is comprised of a pointed cutting blade 82 integrally connected to an arm 84. The cutting blade has a front surface 86, a back surface 88, and a pair of cutting edges 90—90 which form the point 92 at their juncture, the size of the point being defined by a prescribed angle. Each cutting edge is formed by a beveled cutting surface 94 which lies in a plane intersecting with the front surface 86 to form a first angle and with the back surface to form a second angle which is smaller than the first angle (note FIG. 14). The size of the various angles can vary in accordance with the general description set forth above regarding the various angles in the earlier described embodiments.

A triangularly-shaped surface 96 is formed on or cut away from the front portion of the cutting blade 82, which lies in a plane intersecting with the front surface 86 and each of the beveled surfaces 94. As shown in FIG. 12, the surface 96 has three corners; corners 98 and 100 which are located at the points of intersection of the front surface 86 and the beveled surfaces 94, and corner 102 which is located at the point of intersection of the beveled surfaces with respect to each other. A recess 104 is provided on the back surface 88 of the cutting blade 82. This embodiment is attached to a rotatable head, or other movable member, in the same manner as the cutting device 52 illustrated in FIG. 7.

The surface 96 reduces the thickness of the blade 82 so that there is less of a tendency for the blade to cause the slice to bend or warp away from the main extrudate during the slicing operation. The sliced segment is particularly susceptible to such bending if its length or thickness is quite small.

FIG. 15 illustrates another embodiment of the cutting blade and the manner in which it is secured to the cutting head. As shown, a pointed cutting blade 112 is attached to an arm member 114, which is secured to a rotatable head member 116. The arm 114 is formed of a first section 118, to which the blade 112 is attached, and a second section 120, which is fastened to the head by appropriate means. As shown, the section 118 is offset with respect to the section 120 so that its longitudinal axis forms an angle α with the longitudinal axis of section 120. This arangement compensates for the small arc that the blade 112 travels through, as the blade cuts through the tubular product 122. As illustrated, the point of the blade pierces the surface of the product a small distance from the center of the top surface of the tube and follows a path shown by the dotted line. This permits both cutting edges of the blade to cut the product substantially equally. The size of the angle α might vary from about 10–15°.

The above described cutting device can be used for slicing rope-like products formed of a material which is easily deformed, as well as tubular or partially hollow ropes, with excellent results. The pointed cutting blades when properly aligned with respect to the tubular product, accomplish the slicing operation with a minimum amount of impact and friction, of the type which normally might tend to crush or otherwise deform the product. By piercing and penetrating the surface of the product with the pointed blade, and shearing or slicing the product on both of its sides by the double edge blade, a double cutting action is obtained which permits relatively thin slices or segments to be obtained with little or no deformation. As pointed out hereinbefore, the invention is particularly useful for slicing tubular or partially hollow products, which tend to crush easily due to their unsupported internal structure.

In the above description and attached drawings, a disclosure of the principles of this invention are presented, together with some of the embodiments by which the invention might be carried out.

Now, therefore, we claim:

1. A cutting apparatus for slicing a rope-like product comprising a pointed cutting blade having a front surface, and a back surface, and a pair of cutting edges which are joined together to form said point which defines an angle of prescribed magnitude, said back surface including a recess which is separated from the cutting edges by a land portion, each cutting edge being formed by a beveled cutting surface which lies in a plane which intersects with said front surface to form a first angle and with said back surface to form a second angle which is smaller than the first angle, the width of said beveled cutting surface being substantially greater than the thickness of the blade, means for positioning the product at a cutting station, and means for moving said cutting blade along a prescribed path relative to the rope-like product in such a manner that the point formed by the juncture of said cutting edges pierces and penetrates the product first and each cutting edge shears the product thereby severing a segment from said rope-like product.

2. The combination of claim 1 wherein the angle of the point formed by the juncture of said cutting edges ranges from about 60–140°.

3. The combination of claim 1 wherein the angle of the point formed by the juncture of said cutting edges is an acute angle.

4. The combination of calim 1 wherein the second angle formed by the beveled cutting surfaces and the back surface of the cutting blade ranges from about 15–30°.

5. A cutting apparatus for slicing a rope-like product comprising a pointed cutting blade having a front surface, and a back surface, and a pair of cutting edges which are joined together to form said point which defines an angle of prescribed magnitude, each cutting edge being formed by a pair of beveled cutting surfaces, a first beveled surface which lies in a plane which intersects with said front surface to form a first angle and a second beveled surface interposed between the first beveled surface and the edge of the cutting blade, said second beveled cutting surface lying in a plane which intersects with said back surface to form a second angle which is smaller than the first angle, said first and second beveled cutting surfaces forming a third angle at their juncture, said second beveled cutting surface being narrower than said first beveled cutting surface, the width of said beveled cutting surface being substantially greater than the thickness of the blade, means for positioning the product at a cutting station, and means for moving said cutting blade along a prescribed path relative to the rope-like product in such a manner that the point formed by the juncture of said cutting edges pierces and penetrates the product first and each cutting edge shears the product thereby severing a segment from said rope-like product.

6. The combination of claim 5 wherein said first angle ranges in size from about 150–165°, and said second angle ranges in size from about 25–40°.

7. The combination of claim 5 wherein the back surface includes a cavity which is separated from the cutting edges by a land portion.

8. A cutting apparatus for slicing a rope-like product comprising a pointed cutting blade having a front surface, and a back surface, and a pair of cutting edges which are joined together to form said point which defines an angle of prescribed magnitude, each cutting edge being formed by a beveled cutting surfaces which lies in a plane which intersects with said front surface to form a first angle and with said back surface to form a second angle which is smaller than the first angle, the width of said beveled cutting surface being substantially greater than the thickness of the blade, the beveled cutting surfaces of each cutting edge lying in different planes with respect to each other and with respect to the front surface of the blade, a triangularly-shaped surface formed on the front portion of the blade which lies in a plane intersecting with said front surface and with each of said beveled surfaces, means for positioning the product at a cutting station, and means for moving said cutting blade along a prescribed path relative to the rope-like product in such a manner that the point formed by the juncture of said cutting edges pierces and penetrates the product first and each cutting edge shears the product thereby severing a segment from said rope-like product.

9. A cutting apparatus for slicing a rope-like product comprising a pointed cutting blade having a front surface, and a back surface, and a pair of cutting edges which are joined together to form said point which defines an angle of prescribed magnitude, each cutting edge being formed by a beveled cutting surface which lies in a plane which intersects with said front surface to form a first angle and with said back surface to form a second angle which is smaller than the first angle, the width of said beveled cutting surface being substantially greater than the thickness of the blade, means for positioning the product at a cutting station, means for moving said cutting blade along a prescribed path relative to the rope-like product in such a manner that the point formed by the juncture of said cutting edges pierces and penetrates the product first and each cutting edge shears the product thereby severing a segment from said rope-like product, said moving means including a rotatable member, the cutting blade is integrally connected to an arm member, and means for attaching one end of said arm to said rotatable member.

10. A cutting apparatus for slicing a rope-like product comprising a pointed cutting blade having a front surface, and a back surface, and a pair of cutting edges which are joined together to form said point which defines an angle of prescribed magnitude, each cutting edge being formed by a beveled cutting surface which lies in a plane which intersects with said front surface to form a first angle and with said back surface to from a second angle which is smaller than the first angle, the width of said beveled cutting surface being substantially greater than the thickness of the blade, means for positioning the product at a cutting station, means for moving said cutting blade along a prescribed path relative to the rope-like product in such a manner that the point formed by the juncture of said cutting edges pierces and penetrates the product first and each cutting edge shears the product thereby severing a segment from said rope-like product, said means for moving the cutting blade including a rotatable member, and an arm member for attaching said blade to the rotatable member, said arm member being comprised of two sections which are connected together at their ends so that their longitudinal axes form an angle therebetween, said cutting blade being attached to one section, and the other section being attached to the rotatable member.

11. A process for slicing a rope-like product formed of a readily deformable dough material which comprises continuously moving said rope along a given path past a cutting station, rotatably moving a pointed cutting blade having a pair of beveled cutting edges joined together to form the point, past the product along a prescribed path normal to the direction of movement of said moving rope at said cutting station, and slicing said rope without deforming said product by piercing the surface of the product with the point of said blade and shearing the product with the two cutting edges thereby severing a segment of predetermined length from the rope-like product without deforming said product.

(References on following page)

References Cited

UNITED STATES PATENTS

| | | | |
|---|---|---|---|
| 1,161,705 | 11/1915 | Lloyd | 83—636 X |
| 1,964,457 | 6/1934 | Diamond | 83—636 |
| 2,908,328 | 10/1959 | Robertson | 83—580 |
| 2,997,904 | 8/1961 | Gotsch et al. | 83—54 X |
| 3,143,018 | 8/1964 | Everett | 83—54 X |
| 3,334,533 | 8/1967 | Davis | 83—355 X |

FRANK T. YOST, Primary Examiner

U.S. Cl. X.R.

83—54, 355, 580, 592, 675, 925